United States Patent

Suzuki et al.

[11] Patent Number: 6,120,403
[45] Date of Patent: Sep. 19, 2000

[54] PIVOTAL SUPPORT STRUCTURE FOR OSCILLATING MEMBER

[75] Inventors: Tadasu Suzuki, Tokyo-to; Isamu Okabe, Saitama-ken, both of Japan

[73] Assignee: Tsubakimoto Chain Co., Osaka, Japan

[21] Appl. No.: 09/030,431

[22] Filed: Feb. 25, 1998

[30] Foreign Application Priority Data

Feb. 26, 1997 [JP] Japan .................................. 9-042384

[51] Int. Cl.[7] ................................ F16H 7/08; F16H 7/18
[52] U.S. Cl. .......................................... 474/111; 474/140
[58] Field of Search ................................ 474/101, 109, 474/111, 136, 138, 140

[56] References Cited

U.S. PATENT DOCUMENTS

| | | | |
|---|---|---|---|
| 4,832,664 | 5/1989 | Groger et al. | 474/140 |
| 4,921,472 | 5/1990 | Young | 474/111 |
| 5,045,032 | 9/1991 | Suzuki et al. | 474/140 |
| 5,662,540 | 9/1997 | Schnuepke et al. | 474/111 |
| 5,665,019 | 9/1997 | Sheffer et al. | 474/111 |
| 5,846,150 | 12/1998 | Wigsten | 474/111 |

*Primary Examiner*—David A. Bucci
*Assistant Examiner*—Matthew A. Kaness
*Attorney, Agent, or Firm*—Dann, Dorfman, Herrell and Skillman; Henry H. Skillman

[57] ABSTRACT

To provide a pivotal structure of an oscillating member facilitating management of parts and fixing work. The cylindrical peripheral face (11A) of a collar (11), which is fixedly secured by screwing a bolt (4) being inserted in a bolt insertion hole (11C) into a tapped hole (13) in a fixed part (12), is rotatably fitted in a bearing hole (9) bored in a pivot guide portion (6) provided on the side of the pivotal support end of an oscillating member and, by means of collar movement restricting faces (8A, 10A) at the pivot guide portion (6), the cylindrical peripheral face (11A) is prevented from coming off the bearing hole (9). Since, the collar (11) is previously incorporated in the pivot guide portion (6) before the oscillating member is secured to the fixed part (12) and such assemblies can be arranged as a set of parts, management of parts and fixing work are made easier.

8 Claims, 9 Drawing Sheets

PIVOTAL SUPPORT STRUCTURE FOR OSCILLATING MEMBER

FIELD OF THE INVENTION

The present invention relates to a pivotal support structure for an oscillating member and, more particularly, to a pivotal support structure suitable for use in pivotally mounting an oscillating tensioner lever, which is for a chain drive system for driving auxiliaries, to a fixed part of an engine.

BACKGROUND OF THE INVENTION

FIGS. 7 through 9 illustrate prior art systems. Referring to FIGS. 7 and 8, a chain drive system for driving auxiliaries for use in transmitting rotation from a crank shaft of an engine to a cam shaft or the like has a chain c wrapped round a sprocket a on the driving side and a sprocket b on the driven side as shown in FIG. 7 and a shoe tensioner lever d has a shoe e to engage the outside face of the slack run of the chain c.

The tensioner lever d has a pivotal support end f with a pivot guide portion therein with a bearing hole k to be fitted over a larger-diametered portion j of a stepped bolt i threaded in a tapped hole h in a fixed part g on the engine side as shown in FIG. 8.

The axial length of the larger-diametered portion j is somewhat larger than the thickness of the pivot guide portion f of the tensioner lever d. The tensioner lever d, in the state where the stepped bolt i is secured to the fixed part g, is allowed to oscillate with the stepped bolt i taken as the axis of oscillation, while it is restricted in its axial movements between the head of the stepped bolt and the fixed part g.

Further, as shown in FIG. 7, the rear side of the other end portion of the tensioner lever d is pushed and urged by a push plunger m of a tensioner l in the direction to the outside of the chain c, so that a suitable tension is provided to the chain c through the shoe e to prevent it from slackening to thereby prevent the chain c from vibrating while in motion.

FIG. 9 shows an example of another pivotal support structure of the prior art for pivotally supporting a tensioner lever on a fixed part on the engine side. In the pivotal support structure of FIG. 9, a collar n is interposed between the bearing hole k' in the pivot guide portion f of the tensioner lever d' and the bolt i'. The axial length of the collar n is made somewhat larger than the thickness of the pivot guide portion f' and, when the collar n is fixedly secured as shown in FIG. 9 by screwing the bolt i' into the tapped hole h' in the fixed part g' on the engine side, the tensioner arm d' supported with the bearing hole k' in the pivot guide portion f' fitted over the peripheral face of the collar n is allowed to oscillate with the bolt i' taken as the shaft of oscillation.

With the design using a stepped bolt as shown in the above described FIG. 8, there have been problems, e.g., the stepped bolts are expensive because they are bolts of special form, difficult to be standardized as engine parts, and involve difficulties in management of parts.

In the design shown in FIG. 9, the bolts themselves and the cylindrical collars are not expensive because standardized bolts can be used. However, when attaching the tensioner lever to the engine, there have been problems, e.g., three parts, i.e., the tensioner lever, the collar, and the bolt, must be attached as one set of parts and the work to insert the collar into the bearing hole in the pivot guide portion of the tensioner lever and screw the bolt into the tapped hole in the fixed part of the engine has been difficult for the worker to perform even when both hands are used.

SUMMARY OF THE INVENTION

With the foregoing in mind, it is an object of the present invention to solve the above described problems encountered in the prior art systems and to provide a pivotal support structure for an oscillating member which facilitates management of parts and fixing work.

In order to achieve the above mentioned object, a pivotal support structure for an oscillating member of the invention comprises a collar having a bolt insertion hole bored in the center thereof so that the bolt may be passed therethrough along the axis, having a cylindrical peripheral face formed along at least at a portion thereof concentrically with the bolt insertion hole, and adapted to be fixedly secured to the side of a fixed part by having a bolt in the bolt insertion hole screwed into a tapped hole in the fixed part. A pivot guide portion is provided in the pivotal support end of an oscillating member having a bearing hole into which the cylindrical peripheral face of the collar is adapted to be rotatably fitted and having collar-movement-restricting surfaces for restricting movements of the collar in its axial direction, thereby preventing the cylindrical peripheral face from coming out of the bearing hole.

The pivotal support structure of an oscillating member according to the invention is especially suitable for use where the oscillating member is a tensioner lever for a chain.

With the pivotal support structure of the invention, the collar can be incorporated into the bearing hole in the pivot guide portion of an oscillating member in advance of its being mounted to the fixed part of the motor, and such assemblies can be kept as a subassembly and the subassembly can be fixed to the side of a fixed part with a bolt. In order to fix the part to the fixed part, the bolt may be inserted into the bolt insertion hole in the collar with one hand, while holding the oscillating member in the other hand, and then the bolt as it is may be screwed into the tapped hole to be secured to the fixed part.

BRIEF DESCRIPTION OF THE DRAWINGS

The objects of the invention are more fully set forth hereinafter with reference to accompanying drawings, wherein.

DESCRIPTION OF THE PREFERRED EMBODIMENTS

Figure 1:
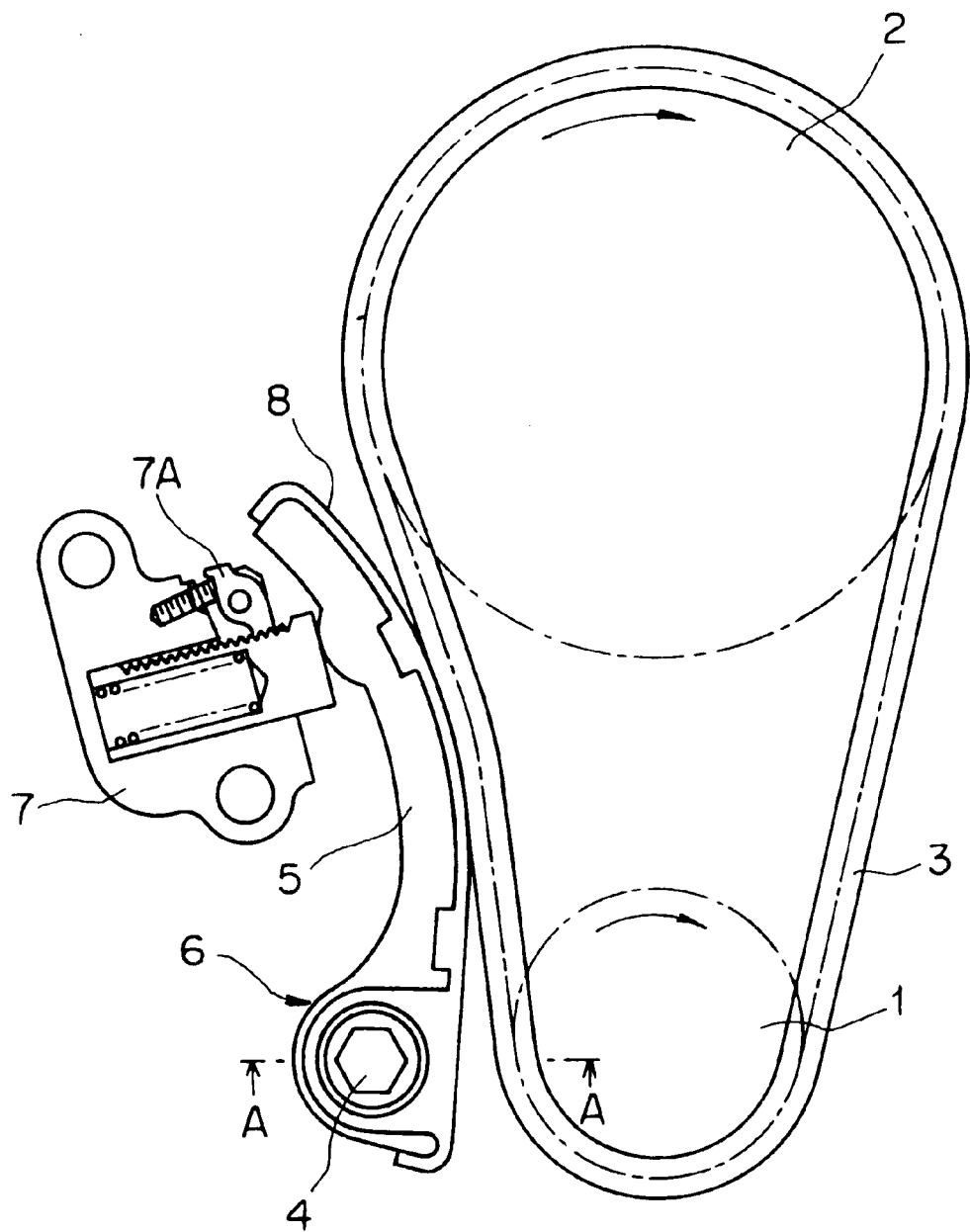
FIG. 1 is a schematic representation of a chain drive system for driving engine auxiliaries showing a first embodiment of a pivotal support structure for an oscillating member according to the invention.

An embodiment of the invention will be described below with reference to FIG. 1, which is a schematic representation of a chain drive system for driving engine auxiliaries, showing a first embodiment of a pivotal support structure for an oscillating member according to the invention. A chain 3 is wrapped round a driving sprocket 1 and a driven sprocket 2 and a pivot guide portion 6 is provided on the side of the pivotal support end of a tensioner lever 5 pivotally supported for oscillation on the slack run of the chain 3 by a collar bolt 4 fixedly secured to the fixed part on the engine side.

In the fixed part of the engine side, there is fixed a tensioner 7 and its push plunger 7A is urged to engage the tensioner lever 5 from behind, whereby a shoe 8, integrally fixed to the tensioner lever 5, is pressed against the outside face on the slack run of the chain 3 to provide a tension to the chain 3 so that it may not produce vibration while in motion.

Figure 2:
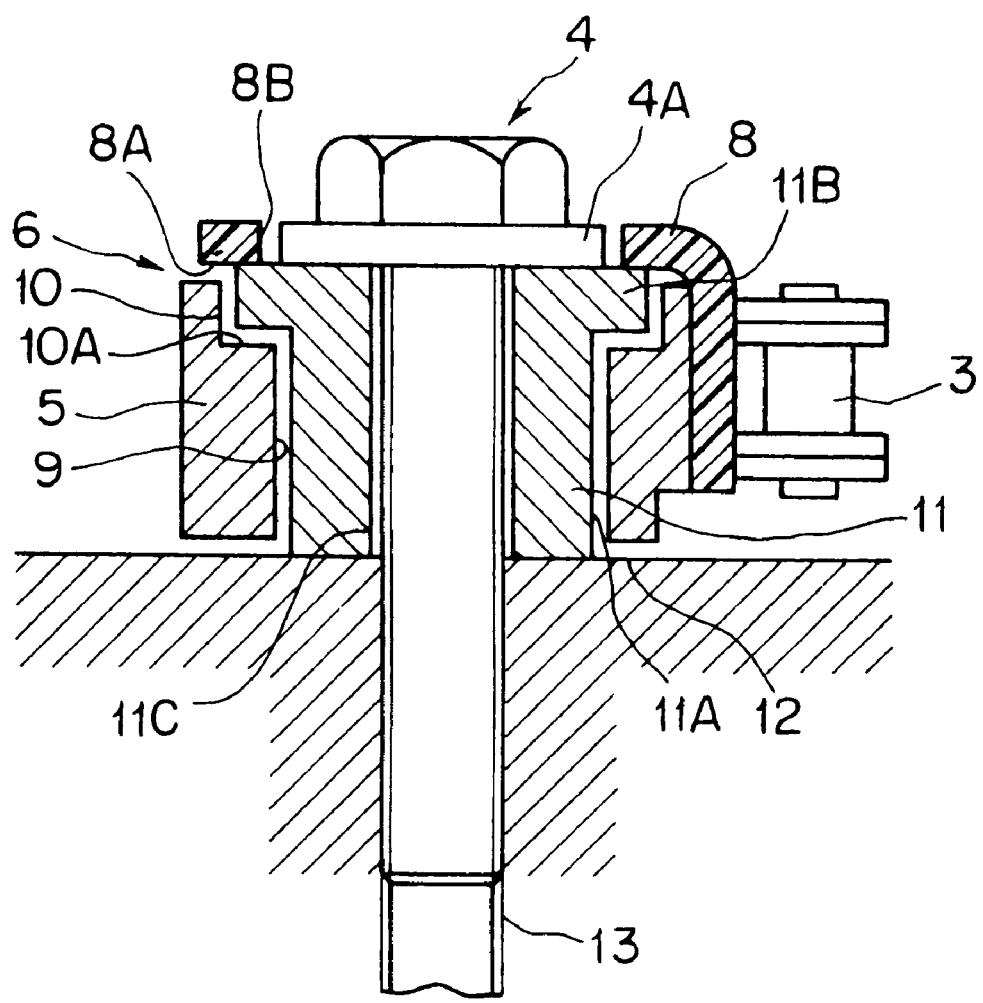
FIG. 2 is a fragmentary sectional view of the pivot guide portion taken in the direction of the arrows in the line A—A of FIG. 1.

As shown in FIG. 2, the tensioner lever 5 is provided at its pivot guide portion 6 with a bearing hole 9 bored therein and, further, with a larger-diametered portion 10, the inner diameter of which is somewhat larger than the inner diameter of the bearing hole 9, contiguously to and concentrically with the bearing hole 9.

The bearing hole 9 is fitted over the cylindrical peripheral face 11A of a collar 11, while the larger-diametered portion 10 accommodates an engagement collar portion 11B being larger in diameter than the cylindrical peripheral face 11A.

The outer end face of the engagement collar portion 11B is confronting the inward rear face 8A of a part of the shoe 8 which overlies one side face of the tensioner lever 5 at its pivot guide portion 6. The inward rear face 8A and the outward face 10A of the larger-diametered portion 10 have the engagement collar portion 11B sandwiched in between, whereby the collar 11 is restricted in its movements relative to the bearing hole 9 in the axial direction. Thus, the inward rear face 8A and the outward face 10A constitute collar-movement-restricting faces in the present invention.

In the center of the collar 11, there is bored a bolt insertion hole 11C passing through it in its axial direction and, by means of a bolt 4 passed through the insertion hole 11C and screwed into a tapped hole 13 in a fixed part 12 on the engine side, the collar 11 is fixedly secured to the fixed part 12. The head portion of the bolt 4 including the collar portion 4A is outwardly projecting from a circular opening portion 8B made in the shoe 8.

Before fixing the above described structure onto the engine, the collar 11 is incorporated into the bearing hole 9 of the tensioner lever 5. This work is performed when fixing the shoe 8 to the tensioner lever 5.

In fixing the tensioner lever 5 to the engine side, the bolt insertion hole 11C in the collar 11 is brought over the tapped hole 13 in the fixed part 12 so as to be in alignment therewith and the bolt 4 is inserted into the bolt insertion hole 11C and screwed into the tapped hole 13, and then, a tightening force is given to the head portion with a tool so that the bolt is secured to the fixed part 12. Now, as shown in FIG. 1, the pivotal support end of the tensioner lever 5 is supported for oscillation with respect to the fixed part 12 taking the collar 11 as the fulcrum.

Figure 3:
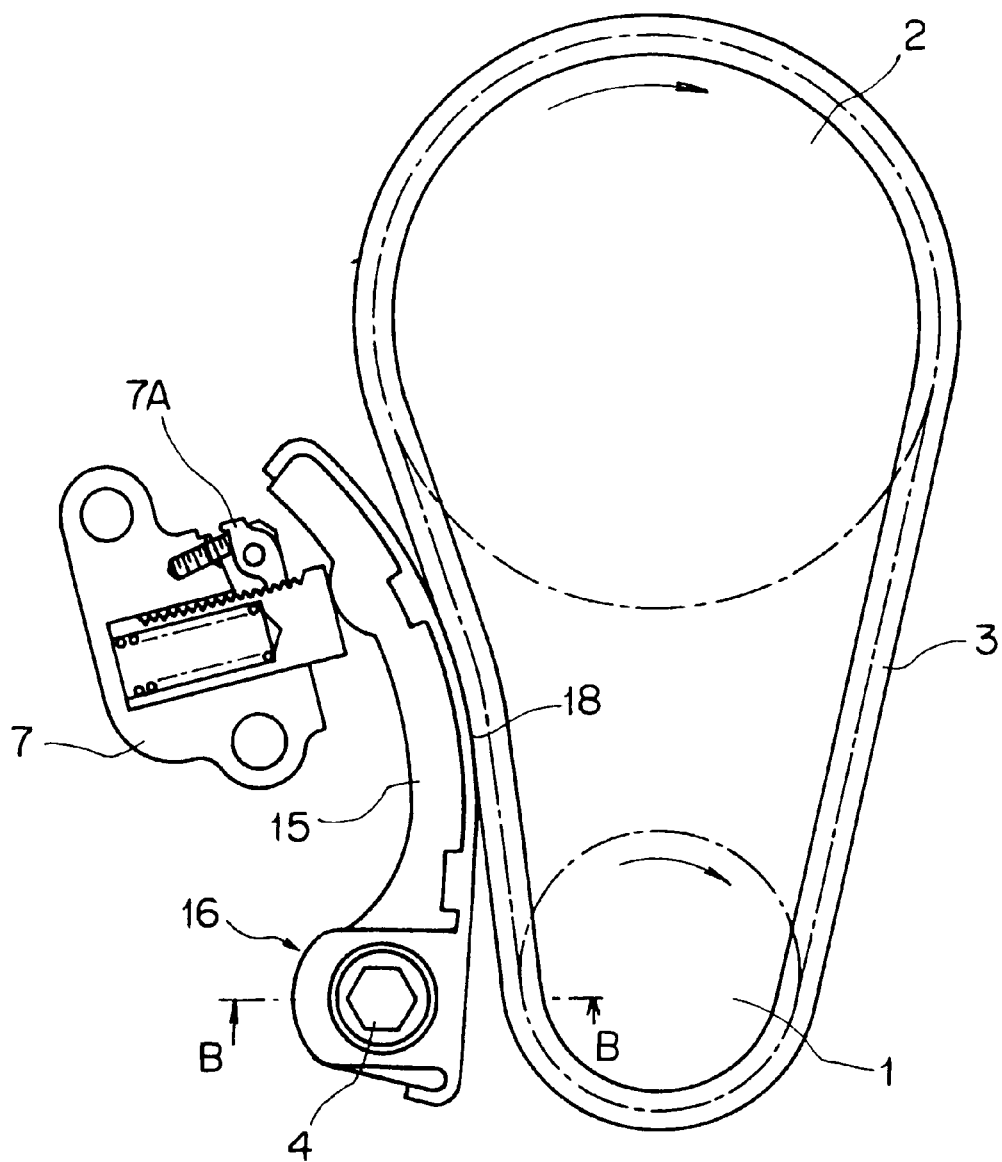
FIG. 3 is a schematic representation of a chain drive system for driving engine auxiliaries showing a second embodiment of a pivotal support structure for an oscillating member according to the invention.
Figure 4:
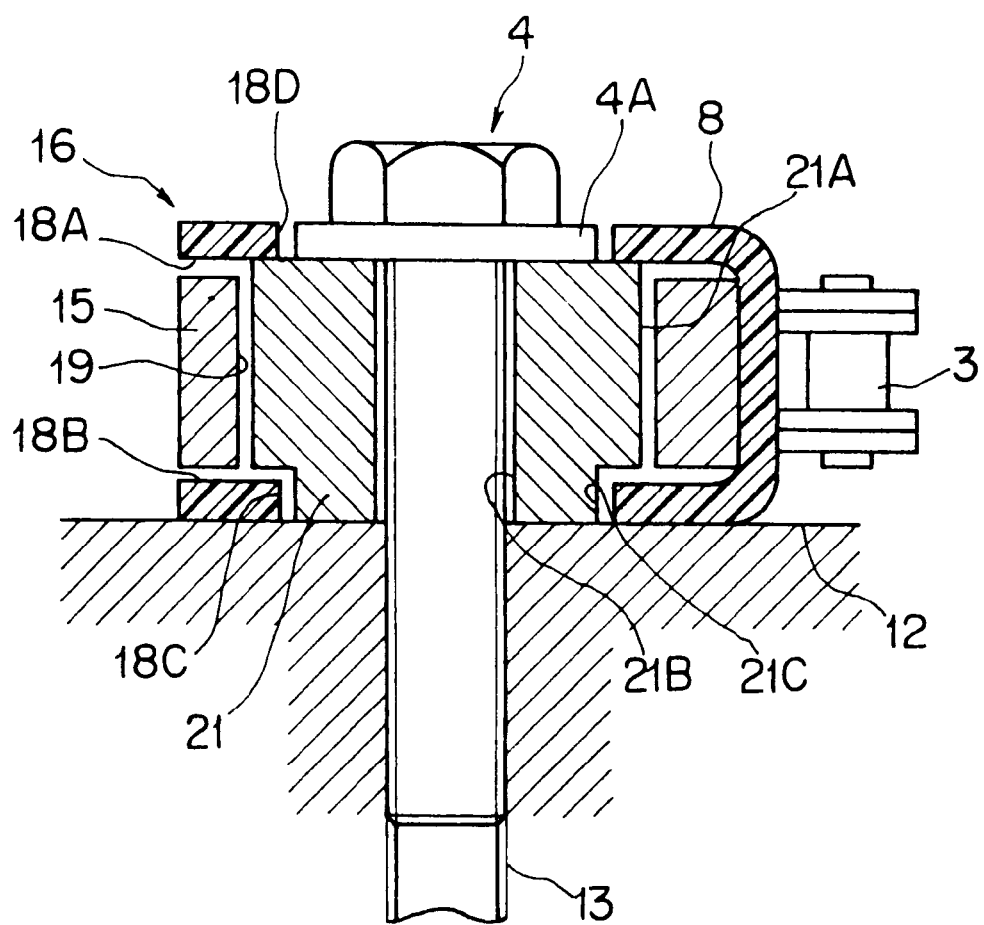
FIG. 4 is a fragmentary sectional view of the pivot guide portion taken in the direction of the arrows in the line B—B of FIG. 3.

FIG. 3 and FIG. 4 show a second embodiment of a pivotal support structure for an oscillating member according to the invention. The embodiment is used, like the structure shown in FIG. 1, as the pivotal support structure for a tensioner lever for a chain drive system. Like members to those used in the embodiment shown in FIG. 1 and FIG. 2 are denoted by corresponding reference numerals in FIG. 3 and FIG. 4 and hence explanation of these members is omitted.

In the present embodiment, as shown in FIG. 4, the shoe 18 on the tensioner lever 15 has overlying and underlying parts 18A and 18B forming a U-shaped cross-section so as to cover both inside and outside faces of the tensioner lever 15 at its pivot guide portion 16.

The tensioner lever 16 has a bearing hole 19 similar to that in the above described embodiment bored therein and the cylindrical peripheral face 21A of the collar 21 is rotatably fitted therein. In the center of the collar 21, there is bored a bolt insertion hole 21B in the axial direction. The bolt 4 passes through the hole, and the collar 21 is adapted to be secured to the fixed part 12 in the same manner as in the case of FIG. 2.

In the present embodiment, the collar 21 has a smaller-diametered portion 21C, smaller in diameter than the cylindrical peripheral face 21A. The part 21C abuts the fixed part 12. The smaller-diametered portion 21C passes through a circular opening 18C smaller in diameter than the bearing hole 19 bored in the shoe 18 and abuts on the fixed part 12 at its end face.

The collar portion 4A of the bolt 4 is positioned within another opening 18D formed in the shoe 18 and abuts on the end face of the collar 21 on the side opposite to the fixed part 12, with the side of the head portion of the bolt projecting outwardly from the shoe 18.

In this embodiment, the collar 21 is restricted in its movements relative to the bearing hole 19 in the downward axial direction by the circumferential portion of the opening 18C in the underlying part 18B of the shoe 18, which confronts an annular step portion formed between the cylindrical peripheral face 21A and the smaller diametered portion 21C of the collar 21, and in the upward axial direction by the circumferential portion of the opening 18D in the overlying part 18A of the shoe 18, which confronts the end face of the collar 21 abutting on the collar portion 4A of the bolt 4. The circumferential portion of the opening 18C in the rear face 18B and the circumferential portion of the opening 18D in the rear face 18A constitute collar movement restricting faces in the invention.

Figure 5:
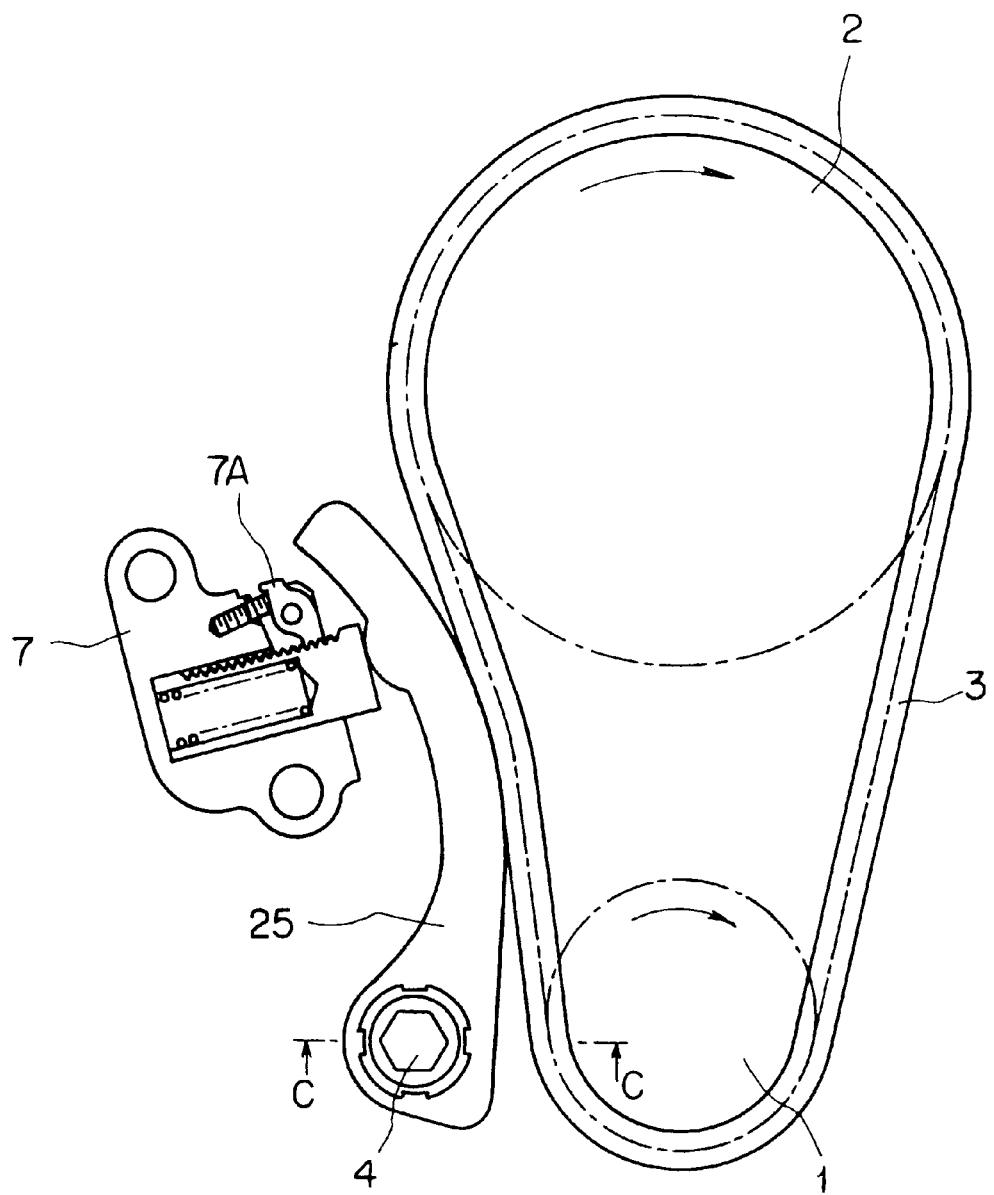
FIG. 5 is a schematic representation of a chain drive system for driving engine auxiliaries showing a third embodiment of a pivotal support structure for an oscillating member according to the invention.
Figure 6:
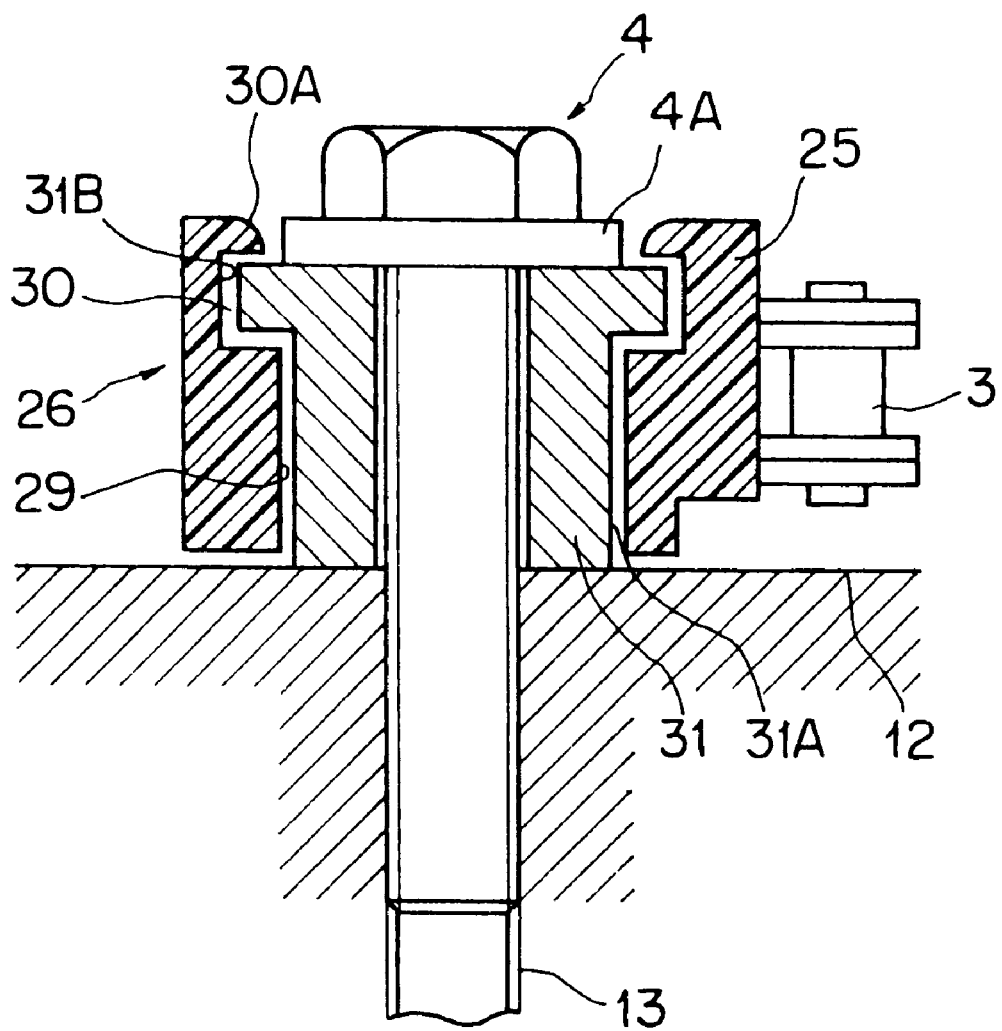
FIG. 6 is a fragmentary sectional view of the pivot guide portion taken in the direction of the arrows in the line C—C of FIG. 4.
Figure 7:
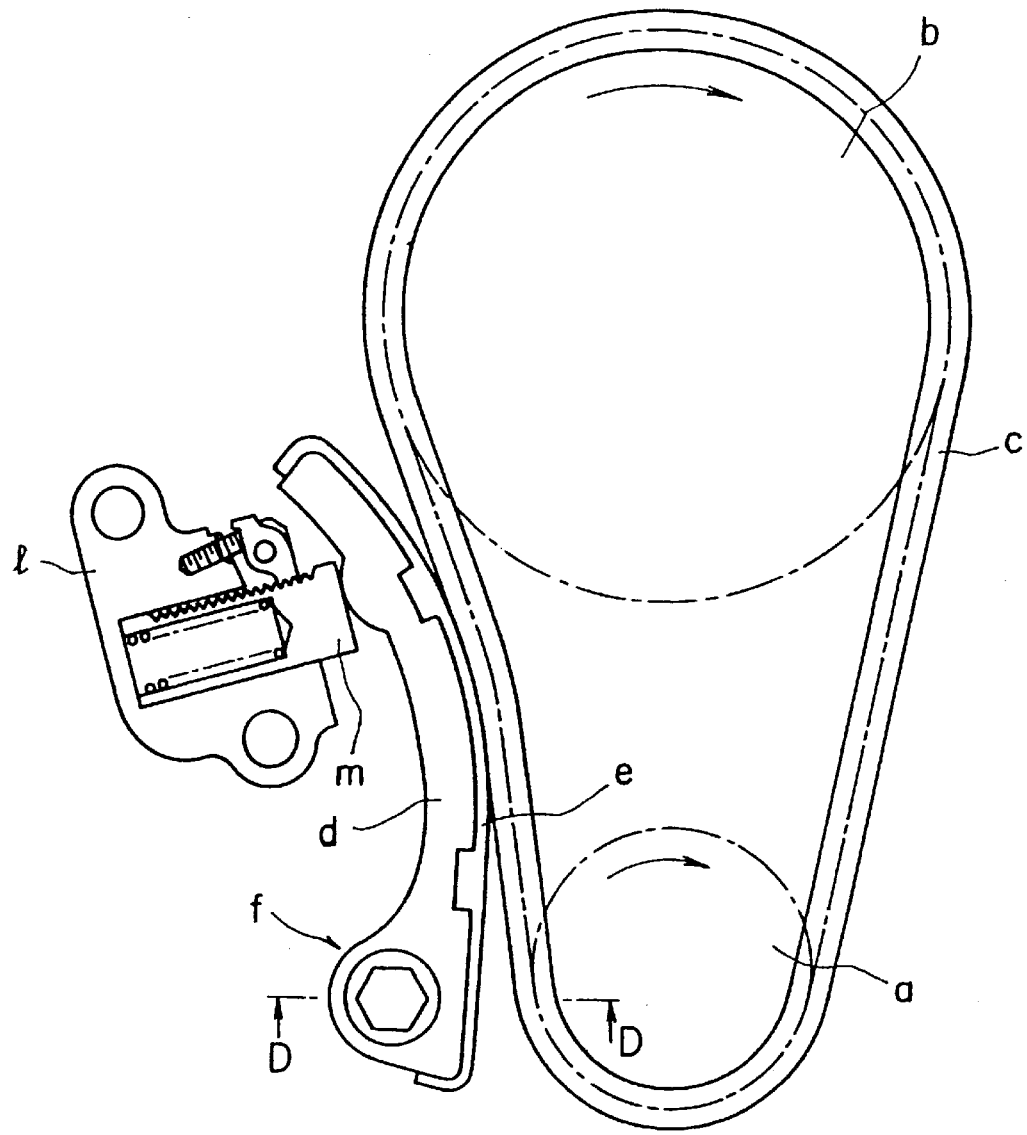
FIG. 7 is a schematic representation of a pivot guide portion showing an example of a conventional pivotal support structure for fixing a tensioner lever in the fixed part on the engine side.
Figure 8:
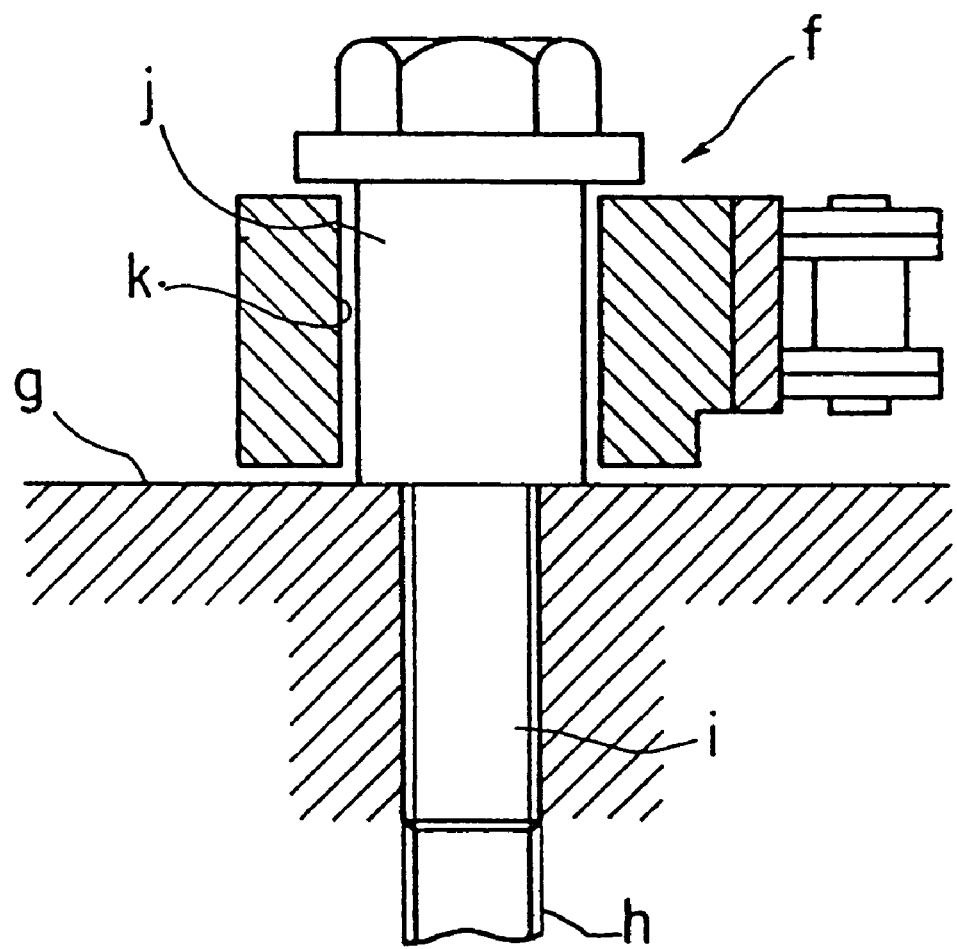
FIG. 8 is a fragmentary sectional view of the pivot guide portion in the direction of the arrows in the line D—D of FIG. 7.
Figure 9:
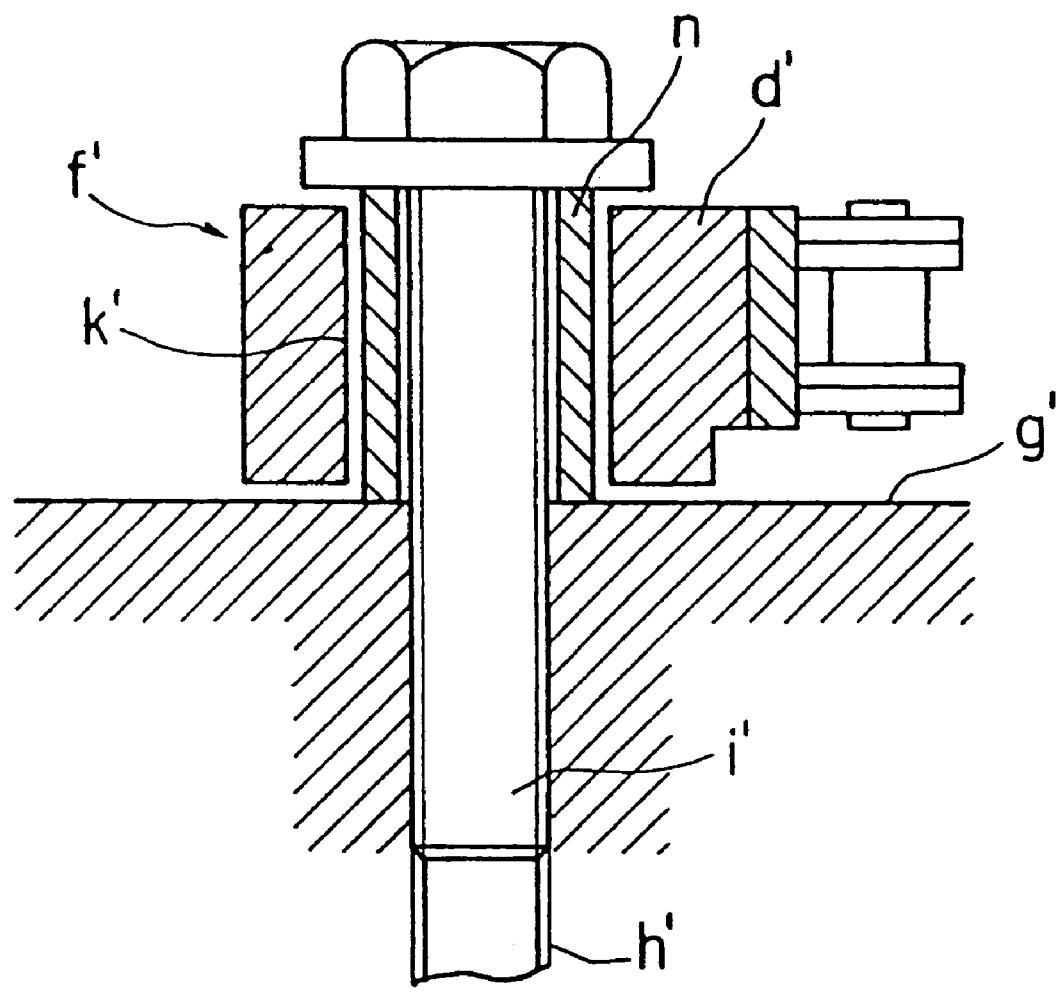
FIG. 9 is a fragmentary sectional view of a pivot guide portion showing another example of a conventional pivotal support structure for fixing a tensioner lever in the fixed part on the engine side.

FIG. 5 is a schematic representation of a chain drive system for driving engine auxiliaries showing a third embodiment of a pivotal support structure for an oscillating member according to the invention and FIG. 6 is a fragmentary sectional view in the direction of the arrows in the position of line C—C of FIG. 5. The present embodiment uses a tensioner lever 25 made of a resin or another resilient material and including an integrally formed shoe slidably contacting the chain 3. Members in FIG. 5 and FIG. 6, similar to those used in the embodiment shown in FIG. 1 and FIG. 2, are denoted by corresponding reference numerals and hence explanation of these members is omitted.

In the pivotal support structure of the present embodiment, as shown in FIG. 6, a bearing hole 29 is rotatably fitted over the cylindrical peripheral face 31A of the collar 31. An engagement circumferential groove 30 is formed contiguously and concentrically with the hole 29 in the pivot guide portion 26 of the tensioner lever 25.

The collar 31 has a similar form to that of the collar 11 shown in the above described FIG. 2, but has an engagement collar portion 31B larger in diameter than, and concentric with, the cylindrical peripheral face 31A, and the outer diameter of the engagement collar portion 31B fits in the engagement circumferential groove 30.

The bearing hole 29 is registered with the cylindrical peripheral face 31A and the engagement collar portion 31B is forcefully inserted into the engagement peripheral groove 30, whereby the collar 31 is restricted in its movements relative to the bearing hole 29 in the axial direction.

When inserting the engagement collar portion 31B of the collar 31 into the engagement peripheral groove 30, the engagement collar portion 31B of the collar 31 is pushed in along the slope on a tapered guiding surface 30A formed at the circumferential portion of the opening of the engagement peripheral groove 30, i.e., on the side face of the tensioner lever 25 on the side opposite to the side confronting the fixed part 12, and thereby the engagement collar portion 31B is engagedly inserted into the engagement peripheral groove 30 with the circumference of the tapered guiding surface 30A along the engagement peripheral groove 30 deformed elastically.

In the present embodiment, the annular faces on the interior of the engagement peripheral groove 30 confronting both sides in the axial direction of the engagement collar portion 31B constitute collar movement restricting faces in the invention.

In the present embodiment, tensioner lever 25 and the shoe are integrally formed of a resin or another resilient material and hence its structure is simple and that the work to incorporate the collar 31 into the tensioner lever 25 is simple.

Although a collar bolt has been used in each of the above described embodiments for fixing the tensioner lever in the fixed part, an ordinary bolt without a collar may be used instead. In either case, standard bolts can be used.

Where a tensioner lever as an oscillating member is pivotally secured to the fixed part on the engine side has been shown in each of the above described embodiments, the oscillating member contemplated in the present invention is not limited to the tensioner lever but the invention will be widely used as a pivotal support structure of oscillating members such as levers and arms used in various machines.

According to the pivotal support structure of an oscillating member of the present invention, as described above, since the collar can be incorporated in the pivot guide portion side of an oscillating member in advance, the work for fixing the oscillating member to a fixed part can be performed by simply aligning the bolt insertion hole bored in the collar, which is already incorporated in the oscillating member, with a tapped hole in the fixed part and passing a bolt through the bolt insertion hole for achieving threaded connection. Accordingly, the assembly in the workshop can be performed quickly and easily.

Since expensive bolts according to special specifications such as stepped bolts need not be used and oscillating members with a collar incorporated therein can be kept in stock as a subassembly, management of parts becomes easier and cost can be lowered.

Especially when the oscillating member is a tensioner lever for a chain, the work for fixing the tensioner lever in the fixed part on the engine side can be effectively performed without the need for high skill.

Further, since standardized bolts can be used as the bolts for fixing the tensioner lever in the fixed part on the engine side, not only cost of parts can be reduced but also management of parts can be made easier because the tensioner levers with a collar previously incorporated therein can be managed as a subassembly.

While a particular embodiment of the invention has been herein illustrated and described, it is not intended to limit the invention to such disclosures, but changes and modifications may be made therein and thereto within the scope of the following claims.

We claim:

1. A pivotal support structure for mounting the support end of an oscillating member on a bolt having a pivotal axis in a fixed part having a tapped hole, said support end having a bearing hole adapted to be mounted on said bolt, said structure comprising:

a collar having a bolt insertion hole in the center thereof so as to extend through the collar along said pivotal axis, said collar having a cylindrical peripheral face formed in at least a portion thereof concentrically with said bolt insertion hole, and an inner axial end face facing toward the fixed part and adapted to be fixedly secured to the fixed part by the bolt being inserted in said bolt insertion hole and screwed into the tapped hole, an opposite axial face facing away from the fixed part adjacent the outer end of the collar, and a third axial face facing toward the fixed part; and said support end having a pivot guide portion, said portion providing at least a part of said bearing hole into which the cylindrical peripheral face of said collar is adapted to be rotatably fitted, and said bearing hole having at least two collar-movement-restricting axial surfaces for confronting said opposite and third axial faces for restricting movements of said collar in its axial direction thereby preventing said collar from coming out of said bearing hole and for permitting said portion to rotate on said collar about said pivotal axis.

2. A pivotal support structure according to claim 1 including a shoe mounted on the oscillating member, said pivot guide portion being integral with said shoe and having a retainer part at least partially overlying said support end and said bolt insertion hole of the collar, providing at least one of said at least two collar-movement-restricting axial surfaces.

3. A pivotal support structure according to claim 2, said pivot guide portion having a second retainer part at least partially underlying said support end, providing another one of said at least two collar-movement-restricting axial surfaces.

4. A pivotal support structure according to claim 3 wherein said first and second retainer parts of said shoe have retainer holes smaller in diameter than said cylindrical peripheral face, and larger in diameter than the diameter of the bolt, said retainer holes being concentric with said pivotal axis, said collar having a part smaller in diameter than said retainer holes, said part extending through the retainer hole in said second retainer part to bear against said fixed part.

5. A pivotal support structure according to claim 1 wherein at least one of said at least two collar-movement-restricting axial surfaces comprises resilient material to facilitate engagement of said collar between said at least two collar-movement-restricting axial surfaces.

6. A pivotal support structure according to claim 1 wherein said support end of the member is formed of resilient material and is shaped to comprise said pivot guide portion as an integral part of the oscillating member.

7. A tensioner for a chain adapted to be supported on a fixed part alongside the chain, the fixed part having a tapped hole defining a pivotal axis, comprising a tensioner lever having a bearing hole, a pivotal support structure for supporting the tensioner lever on said fixed part for oscillation on said pivotal axis, and a plunger engaging said lever to resiliently urge the lever toward the chain about said pivotal axis, said support structure comprising

- a bolt mounted in said tapped hole and defining said pivotal axis,
- a collar having a bolt insertion hole in the center thereof and surrounding said bolt so as to extend through the collar along said pivotal axis, said collar having a cylindrical peripheral face formed in at least a portion thereof concentrically with said pivotal axis, and an inner axial end face facing toward the fixed part and adapted to be fixedly secured to the fixed part by the bolt being inserted in said bolt insertion hole and screwed into the tapped hole, an opposite axial face facing away from the fixed part adjacent the outer end of the collar, and a third axial face facing toward the fixed part; and
- said tensioner lever having a pivot guide portion, said portion providing at least a part of said bearing hole into which the cylindrical peripheral face of said collar is rotatably fitted, and said bearing hole having at least two collar-movement-restricting axial surfaces for confronting said opposite and third axial faces for restricting movements of said collar in its axial direction thereby preventing said collar from coming out of said bearing hole and for permitting said portion to rotate on said collar about said pivotal axis.

8. A tensioner according to claim 7 wherein said tensioner lever has an integral shoe on a side of the lever opposite said plunger said guide portion being integral with said shoe and said lever, said guide portion, said shoe and said lever comprising resilient material, whereby said at least two collar-movement-restricting surfaces are integral with said lever and comprise resilient material.

* * * * *